United States Patent [19]

Takeuchi

[11] Patent Number: 4,460,931
[45] Date of Patent: Jul. 17, 1984

[54] CONTROL APPARATUS FOR A RECORDING/PLAYBACK SYSTEM USING AN ENDLESS RECORDING MEDIUM

[75] Inventor: Hisaharu Takeuchi, Kawasaki, Japan
[73] Assignee: Tokyo Shibaura Denki Kabushiki Kaisha, Kawasaki, Japan
[21] Appl. No.: 103,854
[22] Filed: Dec. 14, 1979

[30] Foreign Application Priority Data

Dec. 20, 1978 [JP] Japan .................. 53-156315

[51] Int. Cl.³ .................. G11B 15/18; G11B 19/00
[52] U.S. Cl. .................. 360/71; 360/72.1
[58] Field of Search .................. 179/6 R; 360/71, 69, 360/72.1, 74.4, 74.5–74.7

[56] References Cited

U.S. PATENT DOCUMENTS

| | | | |
|---|---|---|---|
| 3,621,152 | 11/1971 | Billings | 360/72.1 |
| 3,909,537 | 9/1975 | Jacobson | 179/6 R |
| 4,104,487 | 8/1978 | Jacobson | 360/71 |

FOREIGN PATENT DOCUMENTS 2359994 6/1975 Fed. Rep. of Germany .
2837025 3/1979 Fed. Rep. of Germany .
53-290 1/1978 Japan .

Primary Examiner—John H. Wolff
Attorney, Agent, or Firm—Oblon, Fisher, Spivak, McClelland & Maier

[57] ABSTRACT

A control apparatus for a recording/playback system using an endless recording medium having a position detecting mark attached thereto and driven at a given speed to move along an endless loop, wherein the position detecting mark is detected as the recording medium is driven and a mark position signal generated to indicate each passage of the mark passed a predetermined point in the endless loop. Recording or playback operation is controlled based on the time between detection of successive mark position signals which is indicative of the one-cycle length of the recording medium. The one-cycle length of the endless recording medium is stored as data which may be changed upon changing of the tape length and/or the tape speed. Once the one-cycle length data is stored, automatic recording may be started from any position on the endless recording medium at any time.

9 Claims, 33 Drawing Figures

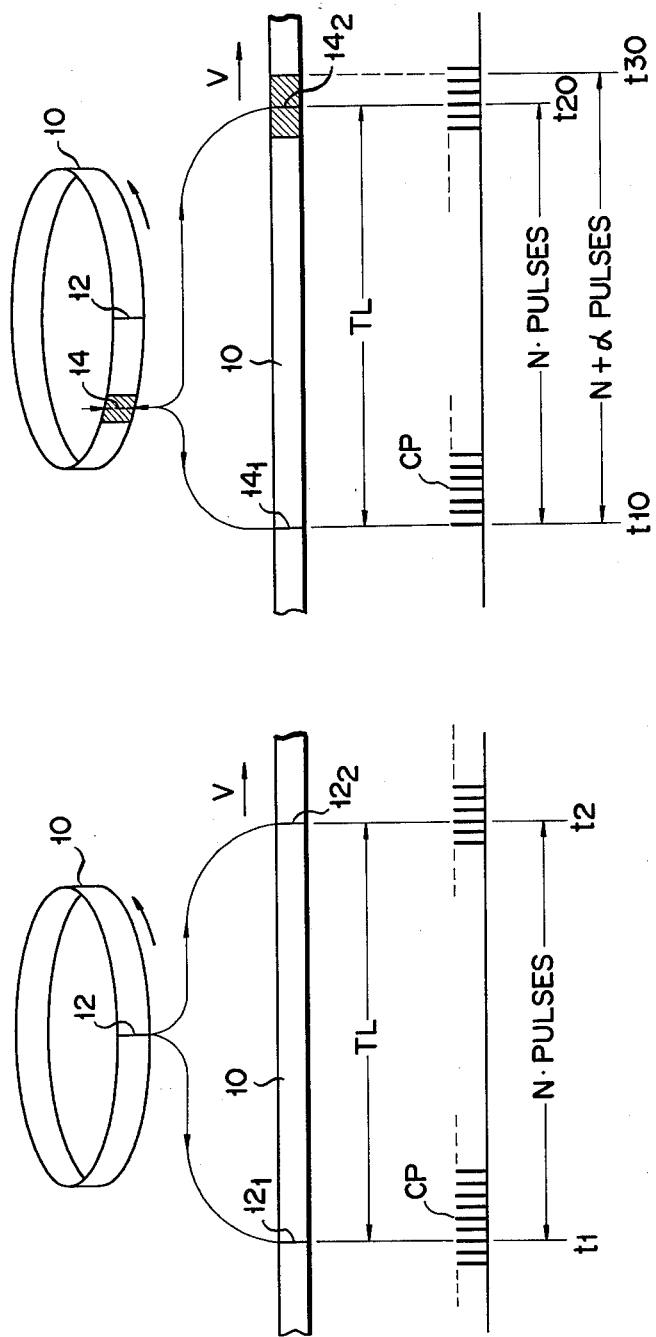

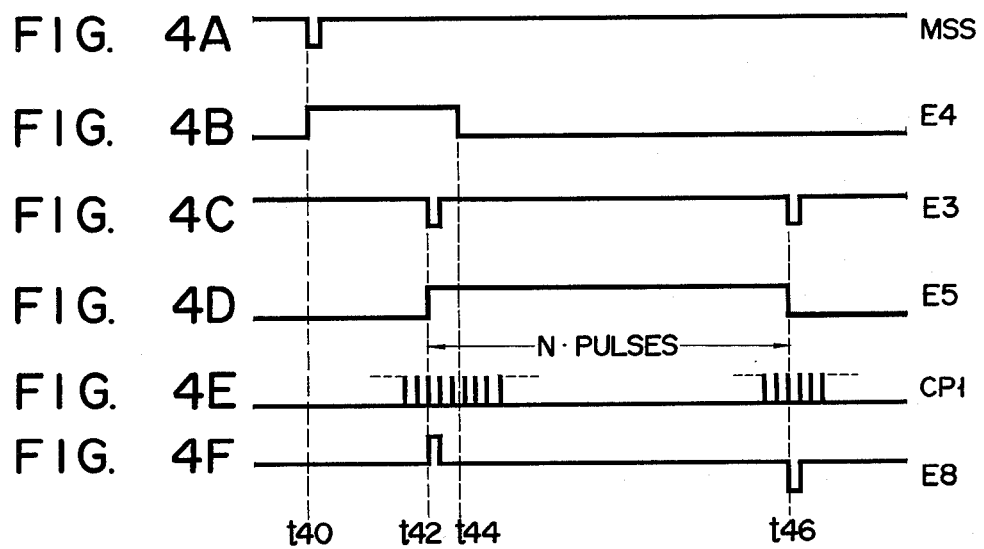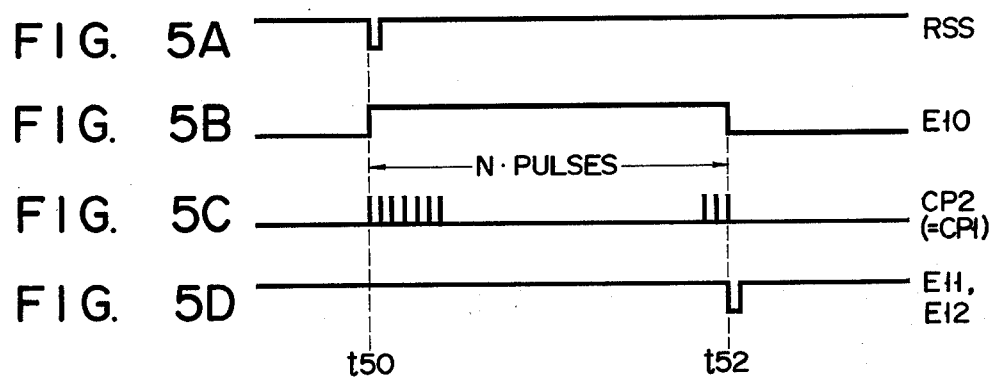

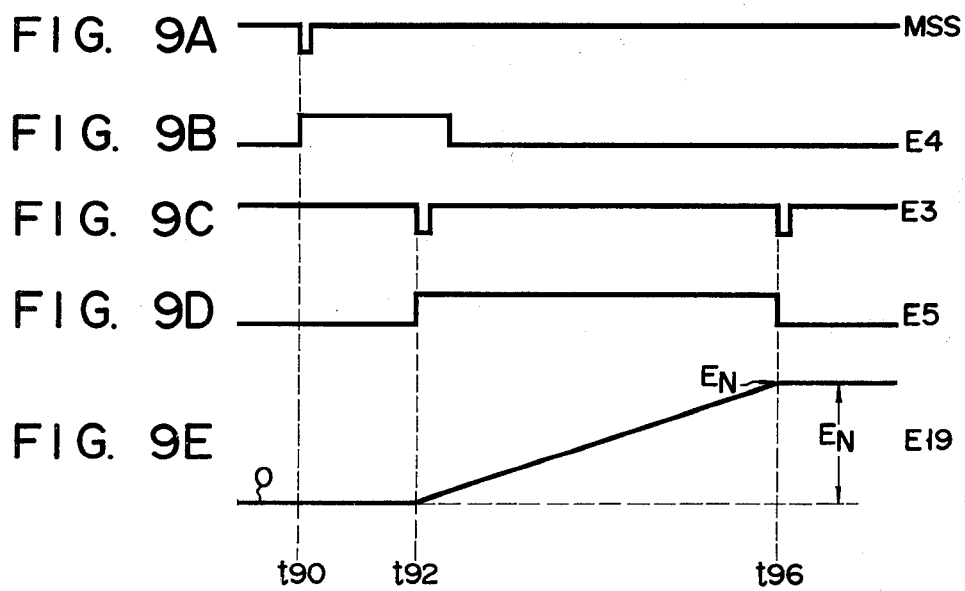
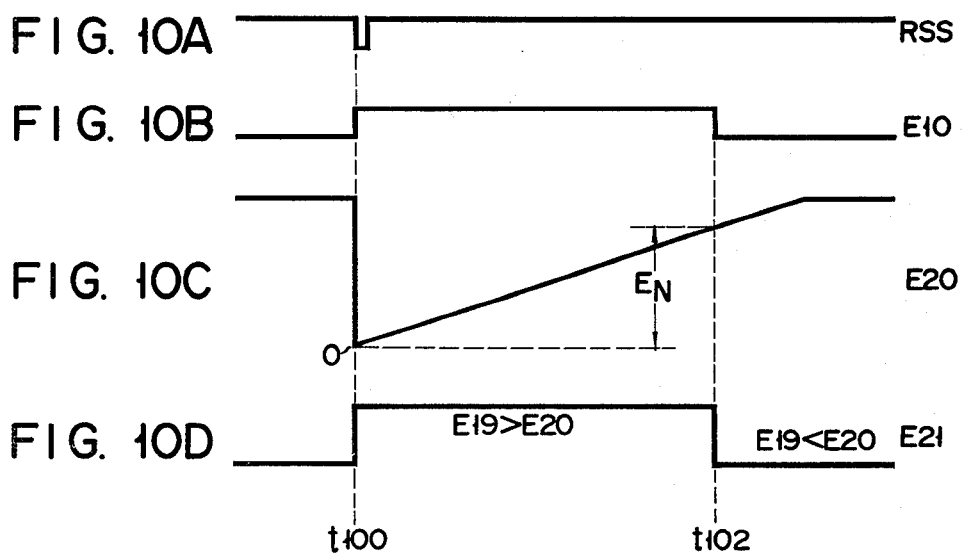

CONTROL APPARATUS FOR A RECORDING/PLAYBACK SYSTEM USING AN ENDLESS RECORDING MEDIUM

This invention relates to a control apparatus for a recording/playback system using an endless recording medium, particularly for a fixed-head type video tape recorder.

In a video tape recorder using an endless tape, one-track recording for one-round or one-cycle length of the tape may be performed using various methods. According to one such method, a mark attached to a specified position of the tape is detected; recording is started with the first detection of the mark and released with the second detection. This method, however, requires a lot of time for the detection of the mark to indicate the start of recording.

In an alternative method, the operating cycle of a monostable multivibrator is set by a variable resistor or the like in conformity to a cycle of tape run, and recording may be performed for the operating time of the multivibrator. According to this method, readiness to of operation, lacking in the aforesaid method, may be improved. However, the operating cycle of the multivibrator is set independently, so that if the time for one complete cycle of tape run is changed owing to changes in the tape length or tape speed, the operating cycle need be renewed as required. Moreover, the tape length may change not only with the recording capability (e.g., 30- or 60-minute recording) of the tape used but also with variations in performance even among tapes of the same standard. Thus, with the method utilizing the operating cycle of the multivibrator, there will be encountered a lot of difficulties in handling or operation.

The object of this invention is to provide a control apparatus of a tape run detecting apparatus capable of automatically adapting itself to various tape lengths and tape speeds, and of immediately starting recording/playback opertion for a one-cycle length of the tape from any position on the tape once the one-cycle length of the tape is stored therein.

In order to attain the above object, there is provided a tape run detecting apparatus according to this invention which comprises a recording medium having a position detecting mark attached to a fixed position thereof and driven at a given speed; mark detecting means for detecting the position detecting mark as the recording medium is driven, whereby a mark position signal to indicate the fixed position is provided; first means for providing a first signal corresponding to data to indicate the one-cycle length of the recording medium by means of measuring a pulse interval of said mark position signal and storing the data; and second means for providing in response to the first signal an output signal to give a timing for controlling recording or playback operation with the recording medium.

According to the apparatus of the above-mentioned construction, the one-cycle length of the endless recording medium used, such as an endless tape, is stored as a data N which may be changed with the one-cycle length and tape speed. The data N can be taken out from the first means at any point of time. Once the data N is stored, therefore, automatic recording for the one-cycle length of the endless tape may be started from any position on the tape at any time.

This invention can be more fully understood from the following detailed description when taken in conjunction with the accompanying drawings, in which:

FIGS. 1 and 2 show a simplified model for illustrating the basic principle of this invention;

FIGS. 4A to 4F show a timing chart for illustrating the operation of the apparatus of FIG. 3 to store a one-cycle length data N of a tape;

FIGS. 5A to 5D show a timing chart for illustrating the operation of the apparatus of FIG. 3 to record the one-cycle length of the tape;

FIGS. 9A to 9E show a timing chart for illustrating the operation of the apparatus of FIG. 8 to store the one-cycle length data N of the tape;

FIGS. 10A to 10D show a timing chart for illustrating the operation of the apparatus of FIG. 8 to record the one-cycle length of the tape;

Figure 3:
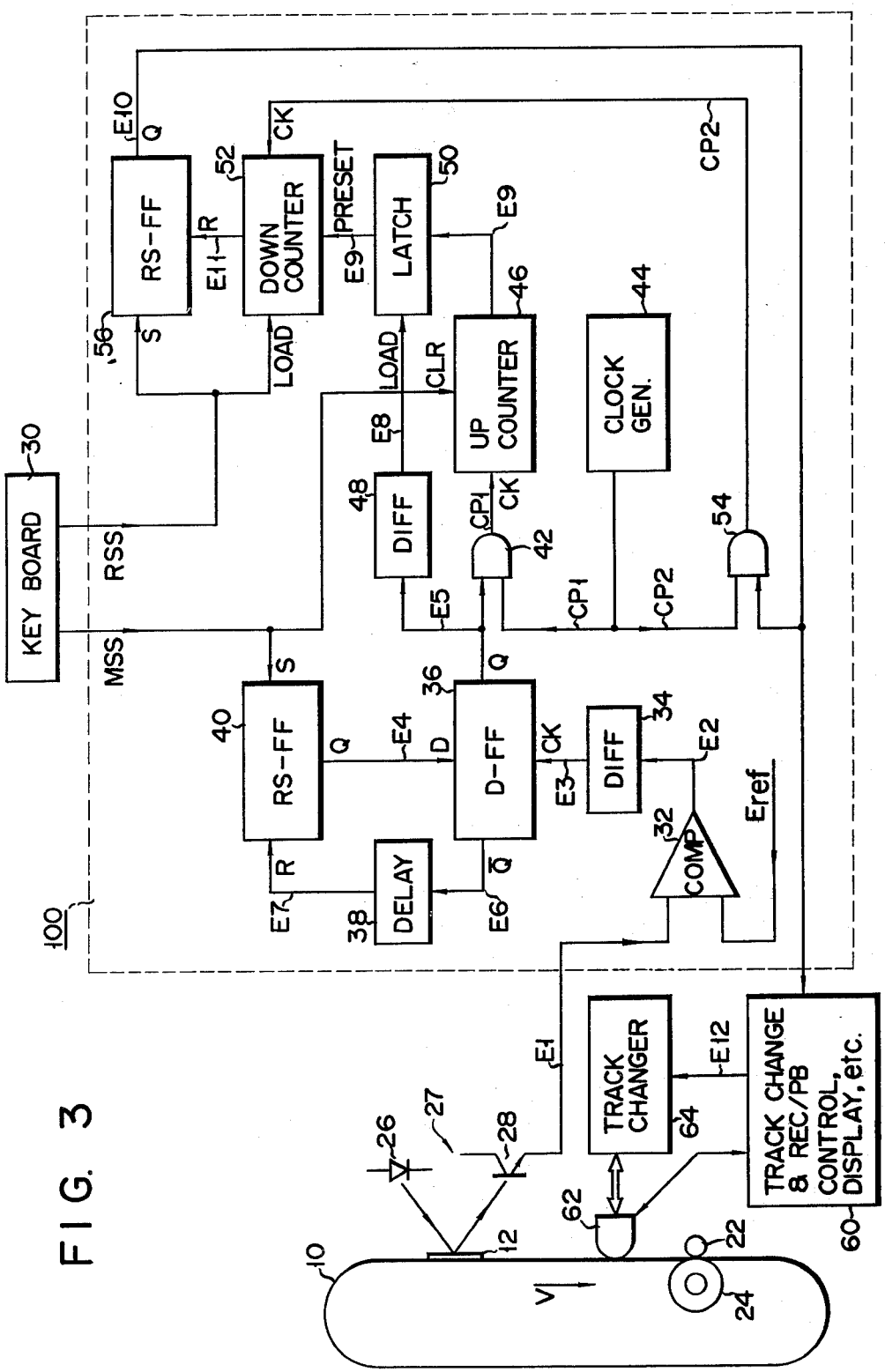
FIG. 3 is a block diagram showing a preferred embodiment of the apparatus of the invention, in which signal processing is performed digitally.

Some preferred embodiments of a control apparatus according to this invention will now be described by way of example and with reference to the drawings. For simplicity of description, corresponding parts or portions of different embodiments and in the different drawings will be given the same or similar reference numerals.

FIGS. 1 and 2 show a simplified model for illustrating the basic principle of the control apparatus of the invention. In FIG. 1, a position detecting mark or reference mark 12 is attached to a recording medium or endless magnetic tape 10. The length TL of the tape 10 is equivalent to the distance between a first reference mark $12_1$ or the mark 12 that is detected for the first time and a second reference mark $12_2$ or the mark 12 that is detected for the second time. Thus, the one-cycle length of the tape 10 may be determined according to the distance between the marks $12_1$ and $12_2$. Here clock pulses CP with a given frequency f are prepared as a substitute for a clock. A data corresponding to the tape length TL can be obtained by measuring a period TP from time t1 when the mark $12_1$ is detected by the clock to time t2 when the mark $12_2$ is detected. For example, let us suppose a case where the tape length TL is 100 m, tape speed V is 6 m/sec, and the clock frequency f is 6 KHz. In this case, the period TP may be given as follows:

$$TP = \frac{TL}{V} = \frac{100}{6} \text{ (sec)} \quad (1)$$

On the other hand, if the pulses CP with the frequency f=6 KHz are counted with the period TP=100/6 as the gate period, then the count value N is $$N = f \times TP = 6 \times 10^3 \times \frac{100}{6} = 10^5 \quad (2)$$

From equations (1) and (2), we obtain $$N = f \times TP = \frac{f}{V} TL \quad (3)$$

In equation (3), the parameters f and V are known, so that the count value $N=10^5$ directly corresponds to the tape length TL=100 m. The count value or data N once obtained may be stored in an RAM or other memory means.

When the data N is obtained, recording operation for the one-cycle length of the tape 10 can be controlled without regard to the position of the mark 12. FIG. 2 shows how such control is performed. Assuming that recording is started at an optional position 14 on the tape 10 and ended when the position 14 is reached again, let the recording be started at a position $14_1$ at time t10. The moment the recording is started, $N=10^5$ is preset as the data N, and is decreased with the passage of time. If the rate r of such decrease or decrement is $r=6\times 10^3$/sec, the value of the data N becomes zero at time t20, $N/r=10^5/(6\times 10^3) \approx 16.7$ sec after t10. Since the tape 10 is driven at a tape speed V=6 m/sec, the tape length $TL \approx 6 \times 16.7 \approx 100$ m covered in a period $t20-t10 \approx 16.7$ sec may be obtained by detecting the data N=0. Since the tape 10 has the one-cycle length of 100 m, a position $14_2$ which is identical with the position $14_1$ may be detected by detecting the data N=0. Namely, recording operation for the cycle length of the tape 10 is performed automatically by controlling a recording circuit so that recording is started at time t10 and ended the moment the data N=0 is detected. Also, by presetting $N=10^5$ as the data N for each cycle of the tape drive and changing the recording track of a magnetic head by means of N=0 detected with every cycle, recording may be automatically performed across the full width of the tape 10 on the basis of the one-cycle length as the unit.

Actually, the tape 10 is driven by mechanical means, so that the influences of the accuracy or precision (running performance) of the tape driving mechanism and the elasticity of the tape 10 cannot always be ignored. For example, when the tension applied to the tape 10 changes with the tape run to vary the slip between capstan/pinch roller and the tape 10, the tape speed V will make a change, scanty as it is. If such speed change averages ±0.1% involving a quantization error of ±1, then the tape length TL=100 m which is covered by $10^5$ pulses given by the data $N=10^5$ will undergo a change of ±0.1%, i.e., ±10 cm. The hatched section in FIG. 2 corresponds to the change of ±10 cm. If such change is negative or −10 cm, a blank of 10 cm length will be formed on the tape 10 between the recording ending position $14_2$ and the recording start position $14_1$. If such blank is created, noise may be caused or signals for the preceding recording operation that are left unerased will possibly be reproduced when reproducing at such blank portion. The blank for the change of ±10 cm (±0.1%) can be removed by increasing the value of the data N by 0.1%. For example, if N=100,000 is obtained by detecting the reference mark 12, a data N+α=100,100 involving 0.1% extra need be used. If the data N+α=100,100 is used with the average speed change of the tape 10 at zero, the recording ending time will be t30.

Although the control based on the one-cycle length of the tape has been described hereinbefore, control may be performed also on the basis of a length shorter than the one-cycle length of the tape, e.g. ½ cycle, as the unit. The ½-cycle-based control can be achieved by halving the data N or doubling the decrement rate r, that is, by changing the ratio N/r. If $r=12\times 10^3$/sec is combined with $N=10^5$, for example, the data N becomes zero $N/r=10^5/(12\times 10^3) \approx 8.3$ sec after time t10. If recording is performed with the tape speed V=6 m/sec for 8.3 sec, then a tape length of 50 m or ½-cycle length will be covered. Likewise, control can be achieved on the basis of 1/n cycle length (n=1, 2, 3 . . . ) as the unit.

This invention may also be applied to automatic track change in a playback operation. When changing the tape speed in the playback operation for e.g. slow motion reproduction, however, the data N or the decrement rate r need be changed in response to such speed change.

FIG. 3 is a block diagram showing a preferred embodiment of this invention. Here recording and/or playback operation for the one-cycle length of the tape is to be controlled by means of a digital circuit. First described will be how the data for the one-cycle length of the tape is obtained. A measurement start signal MSS as shown in FIG. 4A is given by means of a keyboard 30 at time t40. Alternatively, with use of a circuit (not shown) to generate the signal MSS, the signal MSS may be given by using a timer or the like after a fixed tape speed is reached. In response to the trailing edge of the signal MSS, an up-counter 46 is cleared, and an RS flip-flop 40 is set. Then, the logic level of an output signal E4 of the flip-flop 40 becomes "1", as shown in FIG. 4B.

On the other hand, the position detecting mark or reference mark 12 is detected by a photo transistor 28. Here aluminium foil is used for the mark 12, for example. Light emitted from an LED 26 is received by the transistor 28. The LED 26 and the transistor 28 constitute a tape mark sensor 27. The tape 10 is driven at the predetermined speed V by a capstan 22 and a pinch roller 24. When the mark 12 is not on a reflecting surface on which an optical path extending from the LED 26 to the transistor 28 is refracted, the level of an output signal or mark position signal E1 of the transistor 28 is low. When the mark 12 reaches the reflecting surface, the intensity of light led to the transistor 28 increases to raise the level of the signal E1. The signal E1 is compared with a reference level Eref by a comparator 32. Where E1<Eref, the logic level of an output signal E2 of the comparator 32 is "1". When the mark 12 is detected to provide a relation E1>Eref, the logic level of the signal E2 becomes "0". The signal E2 is converted into a pulse signal E3 as shown in FIG. 4C by a differentiation circuit 34. Namely, the signal E3 is produced the moment the mark 12 is detected by the transistor 28.

The signal E3 is applied to the clock input terminal of a D-type flip-flop 36. The D-input terminal of the flip-flop 36 is supplied with the signal E4 whose logic level is "1" on and after time t40. When the flip-flop 36 is clocked in response to the trailing edge of the signal E3 at time t42, the logic level of a Q-terminal output signal E5 of the flip-flop 36 becomes "1", as shown in FIG. 4D. As for a $\overline{Q}$-terminal output signal E6 of the flip-flop 36, it is delayed a little and converted into a reset signal E7 by a delay circuit 38. The signal E7 is applied to the reset input terminal of the flip-flop 40. Then, the flip-flop 40 is reset, and the logic level of the signal E4 is returned to "0" at time t44, as shown in FIG. 4B.

The signal E5 whose logic level is "1" on and after t42 is applied to the first input terminal of an AND gate 42. The second input terminal of the AND gate 42 is supplied with a first clock signal CP1 with a given frequency f, as shown in FIG. 4E, from a clock generator 44. The signal CP1 is supplied to the clock input terminal of the counter 46 while the gate 42 is opened in response to the logic level "1" of the signal E5. The signal E5 which rises at time t42 is differentiated and converted into a pulse signal E8 as shown in FIG. 4F by a differentiation circuit 48. The signal E8 is applied to the load input terminal of a latch 50. Cleared on and after time t40, the counter 46 does not count the signal CP1 before time t42. Accordingly, the logic level of a signal E9 to indicate the count value of the counter 46 is "0". The zero signal E9, however, is not loaded at the rising (positive pulse) of the signal E8. Loading at the latch 50 is performed in response to the trailing (negative pulse) of the signal E8.

While the gate 42 is opened on and after time t42, the counter 46 counts up the signals CP1. In the mean time, the tape 10 is driven at the speed V. After the mark 12 is detected at time t42, it is again detected at time t46. Then, the signal E3 is again produced at time t46, as shown in FIG. 4C. On and after time t44, the logic level of the signal E4 is "0", so that the D-input terminal level of the flip-flop 36 is at logic "0". When the flip-flop 36 is clocked in response to the trailing edge of the signal E3 with D=0, the output signal E5 of the flip-flop 36 is restored to logic "0". That is, after supplied with the signal MSS, the flip-flop 36 is set by the first detection signal E1, and then reset by the next detection signal E1. When the logic level of the signal E5 becomes "0", the gate 42 is closed, causing the counter 46 to stop counting CP1. The level change from "1" to "0" of the signal E5 at time t46 is given to the latch 50 as the differentiation signal E8 as shown in FIG. 4F. Then, in response to the negative trailing edge of the signal E8, the latch 50 is loaded with the signal E9 which indicates the count value N for the period between times t42 and t46. The count value N loaded into the latch 50 is equivalent to the data N as described in connection with FIG. 1 or 2. Namely, the latch 50 stores the data N which corresponds to the one-cycle length of the tape 10.

Thus, the one-cycle length data N of the tape 10 is obtained.

Now there will be described how the recording operation is controlled on the basis of the one-cycle length of the tape 10 as the unit by utilizing the data N. A recording start signal RSS as shown in FIG. 5A is given from the keyboard 30 at time t50. In response to the trailing edge of the signal RSS, a down-counter 52 is preset by the data N or the signal E9 in the latch 50, and an RS flip-flop 56 is set. Then, the logic level of a Q-terminal output signal E10 of the flip-flop 56 becomes "1", as shown in FIG. 5B. The signal E10 whose logic level is "1" on and after time t50 is applied to the first input terminal of an AND gate 54. The second input terminal of the AND gate 54 is supplied with a second clock signal CP2, as shown in FIG. 5C, from the generator 44. When the gate 54 is opened in response to the turning of the signal E10 to logic "1", the signal CP2 is supplied to the clock input terminal of the counter 52 through the gate 54. On and after time t50, the content of the counter 52, i.e. data N, is counted down by means of the decrement rate r equivalent to the frequency of the signal CP2. Here the decrement rate r is equal to the given frequency of the signal CP1. When N pulses of the signal CP2 are inputted between time t50 and time t52, the current number in the counter 52 becomes zero.

When the number in the counter 52 becomes zero at time t52, a borrow signal E11 as shown in FIG. 5D is supplied from the counter 52 to the reset input terminal of the flip-flop 56. The flip-flop 56 is reset in response to the trailing edge of the signal E11. Then, the logic level of the signal E10 is changed from "1" to "0" to close the gate 54 at time t52. Since the signal CP2 has the same frequency with the signal CP1, a period t50 to t52 or the pulse width of the signal E10 is equal to a period t42 to t46 or the pulse width of the signal E5. As is evident from FIGS. 4D and 4E, the data N corresponds to the pulse width (t42 to t46) of the signal E5, so that the signal E5 gives information that the tape 10 has covered a predetermined length, i.e. the one-cycle length. Accordingly, the pulse width of the signal E10 is equivalent to the one-cycle length of the tape 10.

The components 32 to 56 constitute a control means 100 to control recording or playback operation with the tape 10 in accordance with the signal E1. Alternatively, the counters 46 and 52 may be used as down- and up-counters, respectively.

The signal E10 is supplied to a control circuit 60 for track change for magnetic head and/or recording/playback control, track number and mode display, etc. The control circuit 60 causes a magnetic head 62 to perform recording in accordance with the signal E10 for the period (t50 to t52) corresponding to the one-cycle length of the tape 10 after the signal RSS is provided.

The above-mentioned operation may be put in order as follows. When the counter 52 counts down the clock signals CP2 for the number N of clock pulses which covers the one-cycle length of the tape 10 and which is stored in the latch 50 (i.e., when the time for one cycle of tape run has passed), a recording relay control signal interrupts a recording relay (not shown) in the control circuit 60. Thus, recording for the data N to represent the time substantially equivalent to the one-cycle length of the tape 10 can be made.

According to this system, it is possible, after the measurement of the one-cycle length of the tape, to take the recording mode at the moment the recording start signal RSS is given. Further, the data N is automatically renewed by measuring the one-cycle length of the tape as required, so that the mobility and operating capability of the apparatus may greatly be improved without requiring resetting of variable resistor, etc.

The tape cycle length is measured, for example, at the start of tape drive after the power is turned on. This is done because the data N may be lost when the power is cut off unless a nonvolatile memory device is used as the latch 50. When the tape drive is stopped with the power kept on, remeasurement is not necessarily required after the tape drive is resumed, for saving the measuring time. Generally, the measurement is started after the tape speed has reached a fixed speed. However, the tape cycle length may be measured before the fixed tape speed is reached, with use of clocks corresponding to the tape speed, e.g., clocks in proportion to the rotating speed of a capstan, such as digital servo, thereby reducing the time required for obtaining the tape length data N.

After tape replacement or speed change is made, the measurement start signal MSS is produced for the renewal of the data N.

In general, the apparatus is so constructed that the recording start signal RSS may be produced after the data N is stored with accuracy. Therefore, the recording is started after the mark position signal E1 is detected at least twice after the tape drive is started. However, with use of the recording relay control signal, the recording mode can be obtained immediately after the signal E1 is detected once. In this case, after the signal E1 is detected for the second time to provide the data for the one-cycle length of the tape, the recording mode is to be released after the passage of a time corresponding to such data from the start of recording. Although the initial value of the data in the counter 52 is not fixed in the middle of the counting, it will be established by the time the counting is stopped. Accordingly, it is necessary only that a value for the remaining time given by the difference between the data N and the past recording time obtained from the count number in the counter 52 be set in the counter 52 at a point of time when the data N is obtained at the latch 50, previously setting a value $(N+\alpha)$ higher than the maximum value (N) needed as the initial value of the data in the counter 52.

Alternatively, the maximum value $(N+\alpha)$ or standard value (N) of the tape cycle length may be substituted for the initial value of the data in the counter 52 before the data N is obtained at the latch 50.

When performing continuous recording to cover a plurality of tracks, a track change signal E12, which is generated in response to the trailing edge of the signal E10 as shown in FIG. 5D, is applied to a track changer 64. Then, the changer 64 changes the track position of the head 62 each time one pulse of the signal E12 is applied.

Figure 6A:
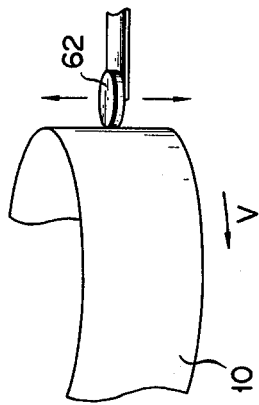
FIG. 6A is a perspective view showing how a head 62 is shifted by a track changer 64 shown in FIG. 3.
Figure 6B:
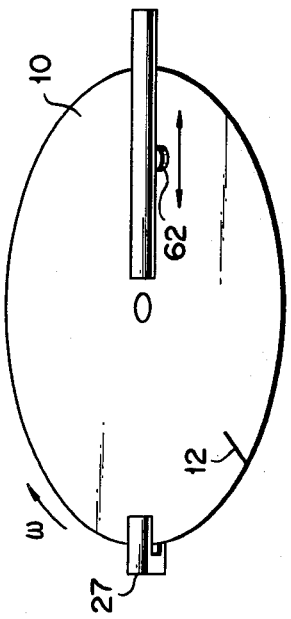
FIG. 6B is a perspective view showing how a head 62 is shifted when a magnetic disc is used with the apparatus of FIG. 3.

FIG. 6A shows how the track position of the head 62 is shifted. In FIG. 6B, a magnetic disc 10 is used for the recording medium. In this case, the head 62 is moved parallel at right angles to a tangent to the circumference of the disc 10 which is driven at a fixed angular velocity $\omega$. The detection of a turn of the disc 10 is performed by detecting the mark 12 by means of a mark sensor 27.

Figure 7:
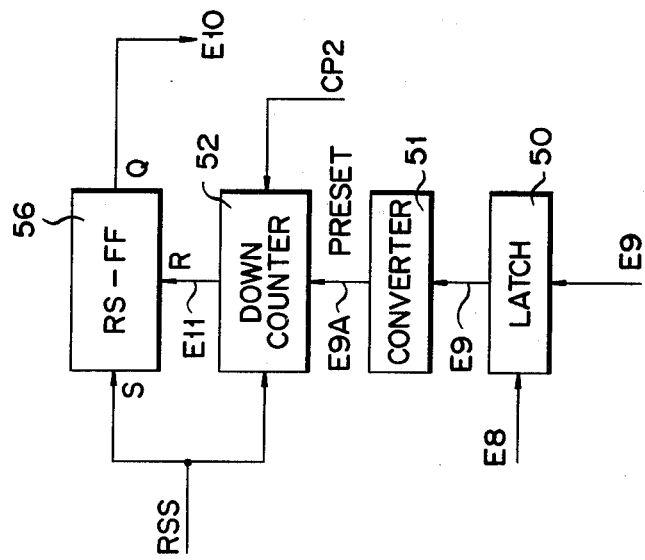
FIG. 7 is a block diagram showing an arrangement for changing a one-cycle length data N obtained with use of the apparatus of FIG. 3 into a data $N+\alpha$ as shown in FIG. 2.

FIG. 7 shows an arrangement for preparing the data $N+\alpha$ from the data N in such manner as described in connection with FIG. 2. In some cases, the data N obtained at the latch 50 may be equivalent to the initial value set in the counter 52. In other cases, however, the data N may be varied by a certain method. In order to avoid noise which may otherwise be caused at an unrecorded joint portion or reproduction of remaining signals that are left unerased, for example, any gap between recorded sections is prevented by making the recording time a little longer than the one-cycle length or period of the tape. This can be achieved by applying an input data $N+\alpha$ to the counter 52 with use of an adder to add a given value $\alpha$ to the data N of the latch 50, for example. The signal E9 (data N) delivered from the latch 50 is once applied to a data converter 51. The converter 51 is formed of an adder or multiplier. In obtaining $N+\alpha=100,100$ as compared with $N=100,000$, for example, the converter 51 may be an adder to add $\alpha=100$ to the data N or a multiplier to multiply the data N by a constant 1.001. Then the down-counter 52 is preset by a signal E9A thus converted into the data $N+\alpha$.

Figure 8:
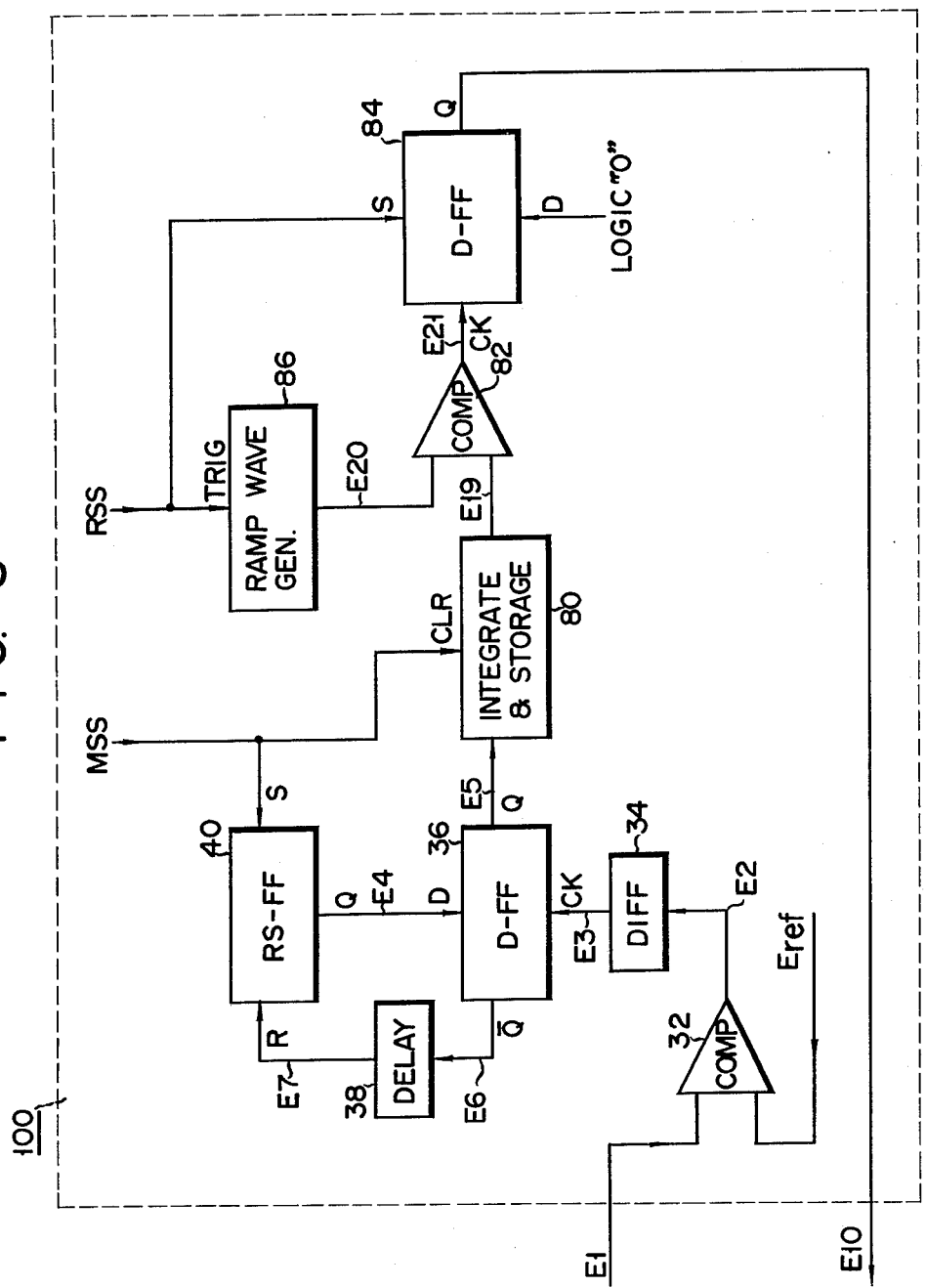
FIG. 8 is a block diagram showing another embodiment of the apparatus of the invention, in which main signal processing is performed using analog circuits.

FIG. 8 is a block diagram in which part of the arrangement of the control means 100 shown in FIG. 3 is replaced by an analog circuit. Processes employed after the measurement start signal MSS as shown in FIG. 9A is provided and until the signal E5 as shown in FIG. 9D is produced, are just the same as the processes described in connection with the components 32 to 40 of FIG. 3 and with reference to FIGS. 4A to 4D.

The signal E5 is applied to an integrator 80. At time t90, the integrator 80 is cleared by the signal MSS. When supplied with the signal E5 whose logic level is "1" on and after time t92, the integrator 80 starts a predetermined integrating operation as shown in FIG. 9E. This integrating operation is continued until time t96 when the signal E5 is restored to logic "0". When the integrating operation is stopped at time t96, the integrator 80 stores a voltage level $E_N$ of a signal E19 to indicate the results of integration. The level $E_N$ is maintained until the integrator 80 is cleared by the signal MSS. The level $E_N$ is proportional to a period t92 to t96, i.e. the one-cycle length of the tape 10. Accordingly, the signal E19 corresponds to the signal E9 or the data N stored in the latch 50 of FIG. 3.

Control of the recording operation is performed as follows. At time t100, a recording start signal RSS as shown in FIG. 10A is applied to the preset (or set) terminal of a presettable D-type flip-flop 84 and the trigger terminal of a ramp-wave generator 86. The flip-flop 84 is set in response to the trailing edge of the signal RSS, delivering a signal E10 as shown in FIG. 10B on and after time t100. When triggered by the signal RSS, the generator 86 produces a ramp-wave signal E20 to start rising from zero potential. The voltage level of the signal E20 is compared with the voltage level $E_N$ of the signal E19 at a comparator 82. As shown in FIG. 10D, the logic level of an output signal E21 of the comparator 82 is "1" as long as $E19>E20$. The moment $E19<E20$ is obtained at time t102, the signal E21 is turned to logic "0". In response to such logic level change or trailing edge of the signal E21, the flip-flop 84 is clocked. The D-input terminal of the flip-flop 84 is supplied with logic "0". Therefore, when the flip-flop 84 is clocked by the signal E21, the signal E10 is restored to logic "0".

During a period t100 to t102 when the logic level of the signal E10 is "1", the pulse width of the signal E10 is proportional to the level $E_N$ of the signal E19 and inversely proportional to the gradient of the signal E20. If the gradients of the signals E19 and E20 are equal, the period t92 to t96 is identical with the period t100 to t102. Thus, the signal E10 becomes a signal with a pulse width corresponding to the one-cycle length of the tape 10.

Figure 11:
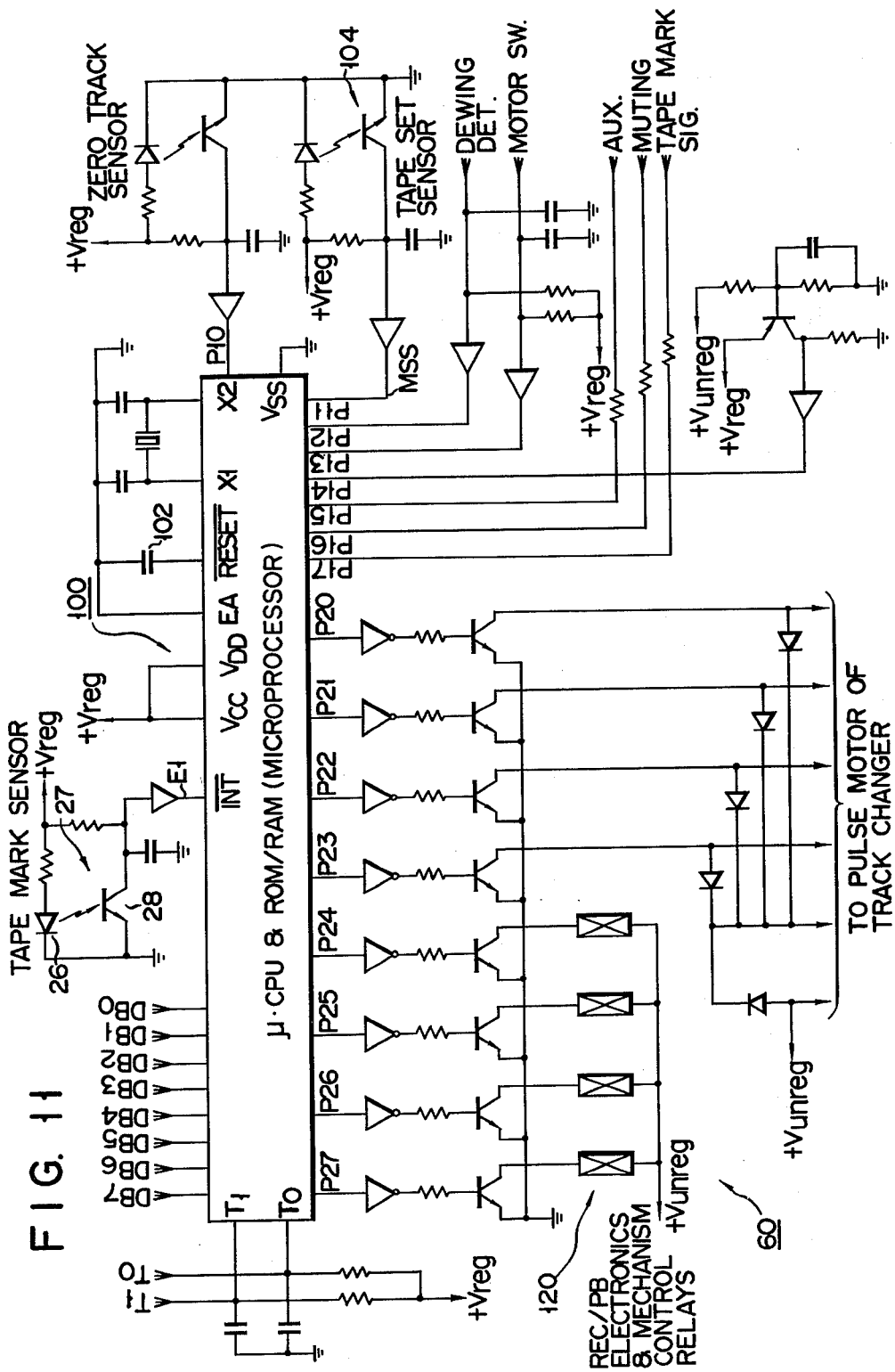
FIG. 11 is a circuit diagram showing an arrangement in which the principal part of the arrangement of FIG. 3 is composed of a microprocessor.
Figure 12:
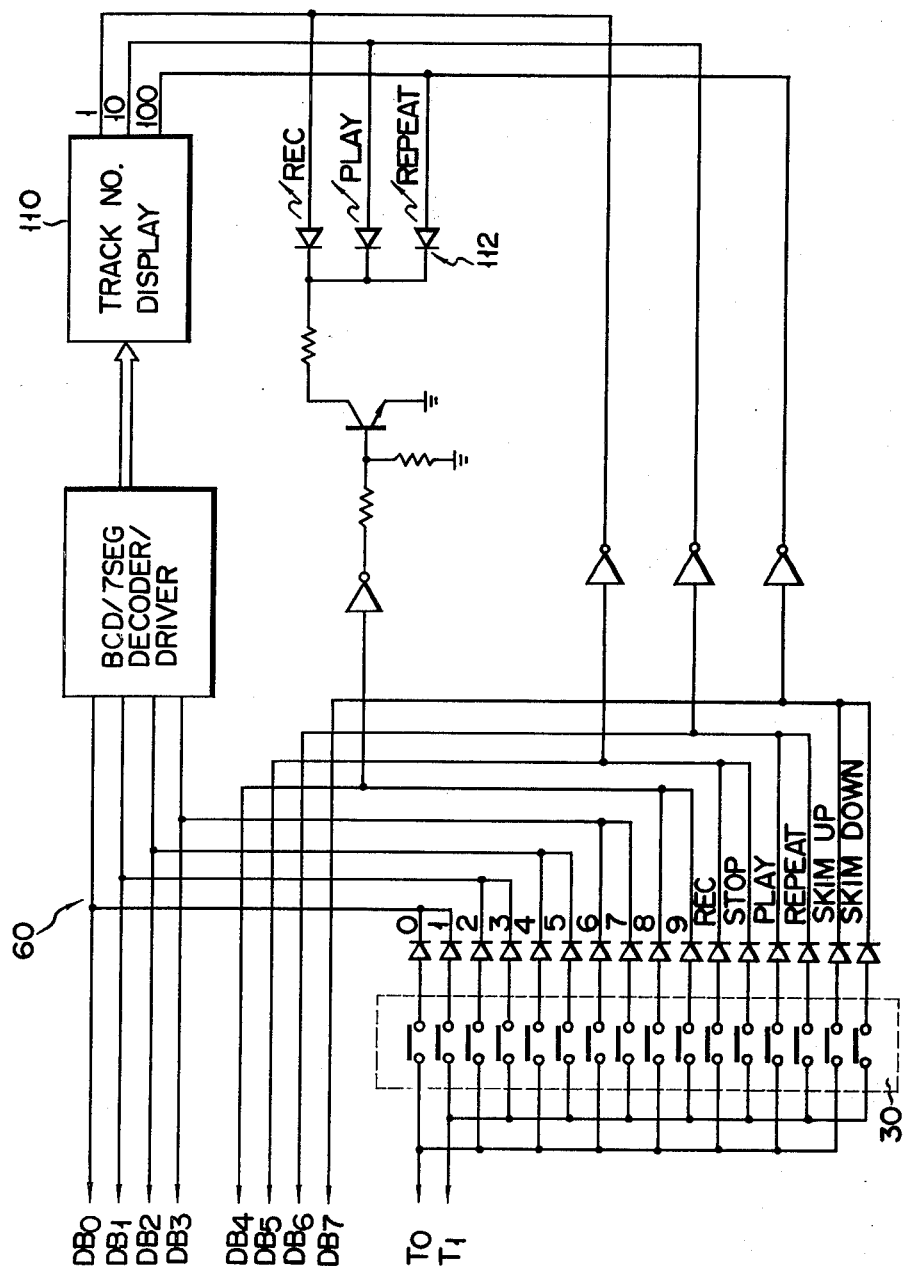
FIG. 12 shows a circuit constituting with part of the circuit arrangement of FIG. 11, a keyboard 30 and a control circuit 60 of the apparatus of FIG. 3.

FIGS. 11 and 12 show an arrangement in which the control means 100 shown in FIG. 3 is formed of a conventional microprocessor. Also, in FIGS. 11 and 12, there is shown arrangements of the control circuit 60 and the keyboard 30. The arrangement of the microprocessor 100 is not the main object of the invention. The operation of the microprocessor 100 will later be described with reference to flow charts. Here the connection between the keyboard 30, the control circuit 60, and the microprocessor 100 is to be described only briefly.

The microprocessor 100 is initialized by initializing means 102 after the power is turned on. When the tape is set in a tape transport mechanism (not shown), a tape set signal is supplied from a tape set sensor 104 to the microprocessor 100. The position detecting mark 12 is detected by the mark sensor 27, and the mark position signal E1 is supplied from the sensor 27 to the microprocessor 100. Commands for change of track position, REC/PB mode, etc. are given from the keyboard 30 to the microprocessor 100 by means of data lines $T_0$, $T_1$ and $DB_0$ to $DB_7$. The recording start signal RSS is given by turning on a "REC" switch of the keyboard 30. The operation mode of the VTR given by operating the keyboard 30 is displaced on a track number display 110 or LED array 112. In accordance with the data given from the keyboard 30, the microprocessor 100 delivers signals (output ports P20 or P23) for driving a pulse motor (not shown) of the track changer 64 or signals (output ports P24 to P27) for driving relays 120 for REC/PB control, etc. Data corresponding to the operating states of the REC/PB electronics, the tape transport mechanism, etc. are applied to the input-output ports P10 to P17.

Figure 13:
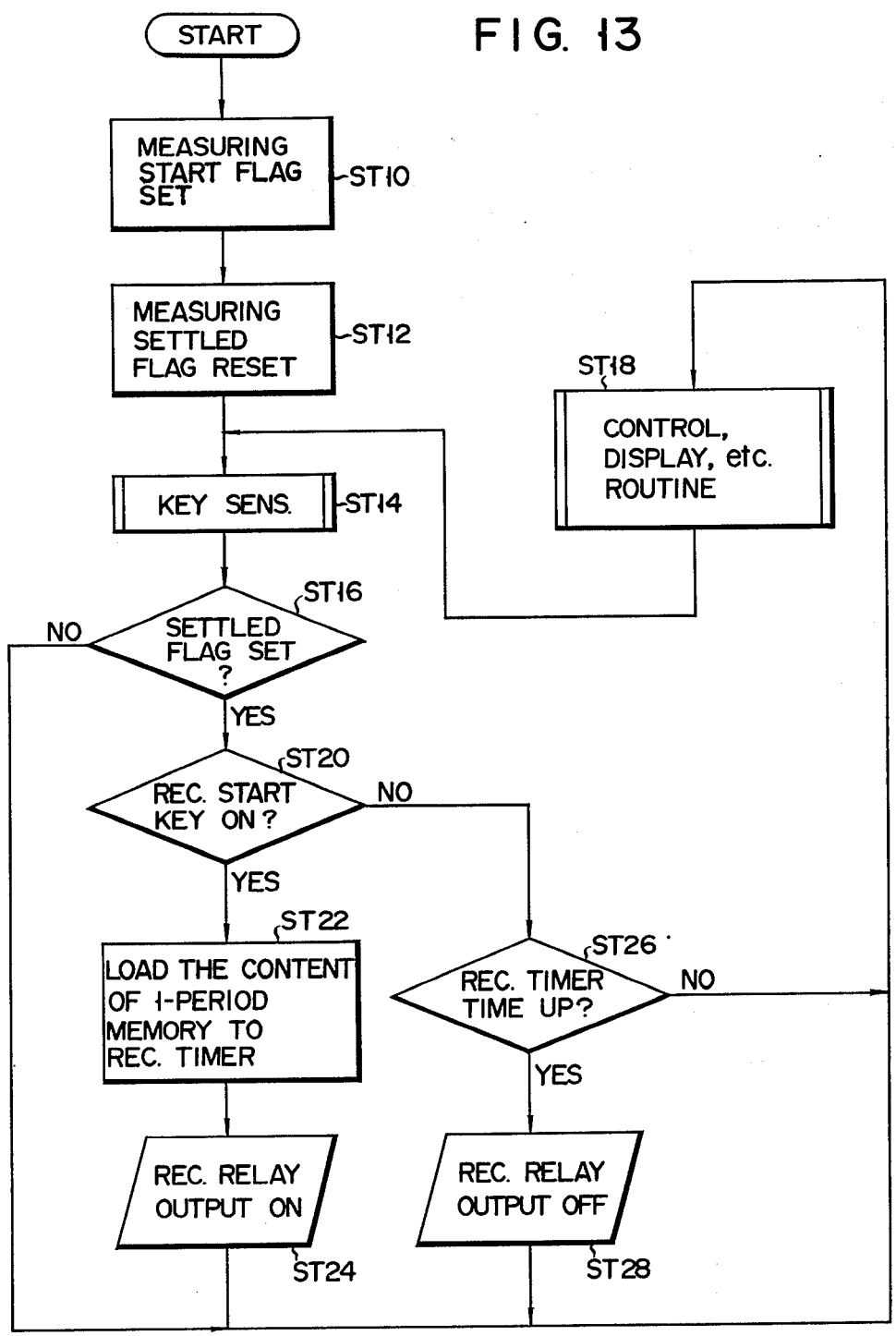
FIGS. 13 to 17 are block flow charts for illustrating the operation of the arrangement as shown in FIG. 11.

FIG. 13 is a block flow chart showing a sequence with use of the microprocessor 100 as shown in FIG. 11. In the following steps, RAM/ROM's and other registers of the microprocessor are utilized for the flag, memory, timer, etc. In step ST10, a measuring start flag is set by the measuring start signal MSS. In step ST12, a measuring settled flag is reset. In step ST14, the on-off state of the keyboard 30 is sensed, while in step ST16 whether or not the measuring settled flag is set is decided. If the measuring settled flag is left reset (NO), step ST18 is entered. In step ST18, predetermined routine including tape cycle length measurement is executed, and step ST16 is resumed via step ST14. If the tape cycle length measurement is completed at step ST18, then the measuring settled flag is set (YES). Then, step ST20 is entered.

In step ST20, a decision is given on whether or not a recording start key is on, i.e., whether or not the recording start signal RSS is provided. If the recording start key is on (YES), step ST22 is entered. In step ST22, the measured one-cycle length data or the content of the one-period memory is loaded in a recording timer. Then, in step ST24, recording relay output is turned on, and step ST18 is entered. In step ST18, routine including recording control, etc. is executed, and step ST20 is reached via steps ST14 and ST16. Let it be supposed that the recording start key is off (NO) at this point of time. Then, step ST26 is entered. In step ST26, a decision is given on whether or not the recording timer is timed up, i.e., whether or not the recording for the one-cycle length of the tape is accomplished. If the recording for the one-cycle length is not completed (NO), step ST18 is resumed for continued execution of the recording control routine.

When the recording for the one-cycle tape length is completed, the recording timer is timed up (YES), and step ST28 next to step ST26 is entered. In step ST28, the recording relay output is turned off, and step ST18 is entered. In step ST18, display routine to indicate the completion of recording for the one-cycle tape length, for example, and routine for a switchover to playback mode are executed, and then step ST14 is resumed. When the track change key and recording start key are turned on in step ST14, the flow of the above-mentioned steps ST14 to ST28 is repeated, and recording for the one-cycle length of another track is performed.

Figure 14:
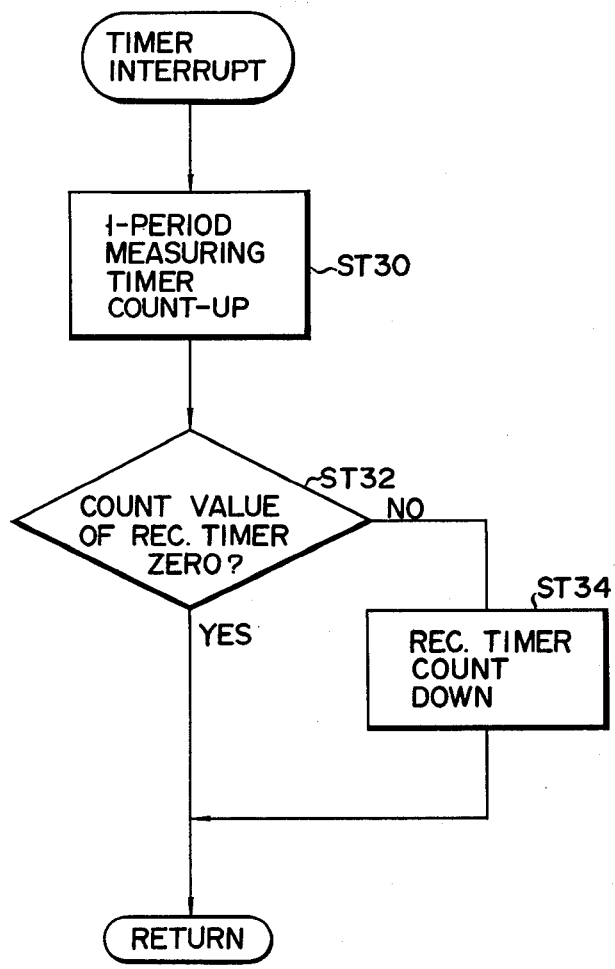

FIG. 14 is a flow chart showing a case of timer interruption. When interruption is made, step ST30 is entered, directly following the interrupted step. In step ST30, the content of a one-period measuring timer is counted up by a predetermined number. Then, in step ST32, a recording timer is checked to see if the count value in the timer is zero. If the value is not zero, step ST34 is entered, the recording timer is counted down, and the original or interrupted step is resumed. If "YES" is obtained in step ST32, on the other hand, the original step is resumed directly.

Figure 15:
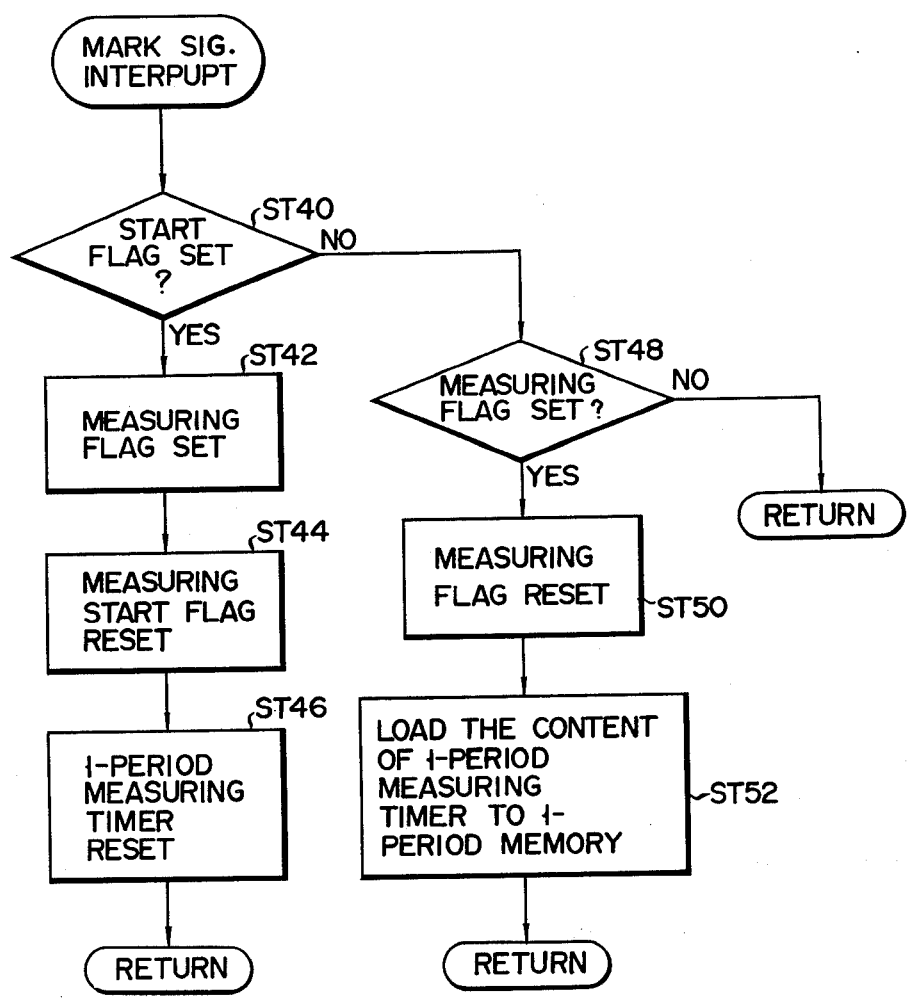

FIG. 15 is a flow chart showing a case of interruption of the mark sensor 27 of FIG. 11 by the position detecting mark 12. First, in step ST40, a decision is given on whether or not the one-cycle length measuring start flag is set. If the flag is found to be set (YES), step ST42 is entered. In step ST42, a measuring flag to indicate measurement being made is set, and step ST44 is entered. The step ST44, the measuring start flag is reset, and step ST46 is entered. In step ST46, the one-period measuring timer is reset, and the original or interrupted step is resumed.

If "NO" is obtained in step ST40, on the other hand, step ST48 is entered. In step ST48, the measuring flag is checked for setting. If "YES" is obtained in step ST48, step ST50 is entered. The step ST50, the measuring flag is reset, and step ST52 is entered. In step ST52, the content of the one-period measuring timer is loaded in the one-period memory. When the processing in step ST52 is settled, the original step is resumed. If "NO" is obtained in step ST48, then the original step is resumed directly.

Figure 16:
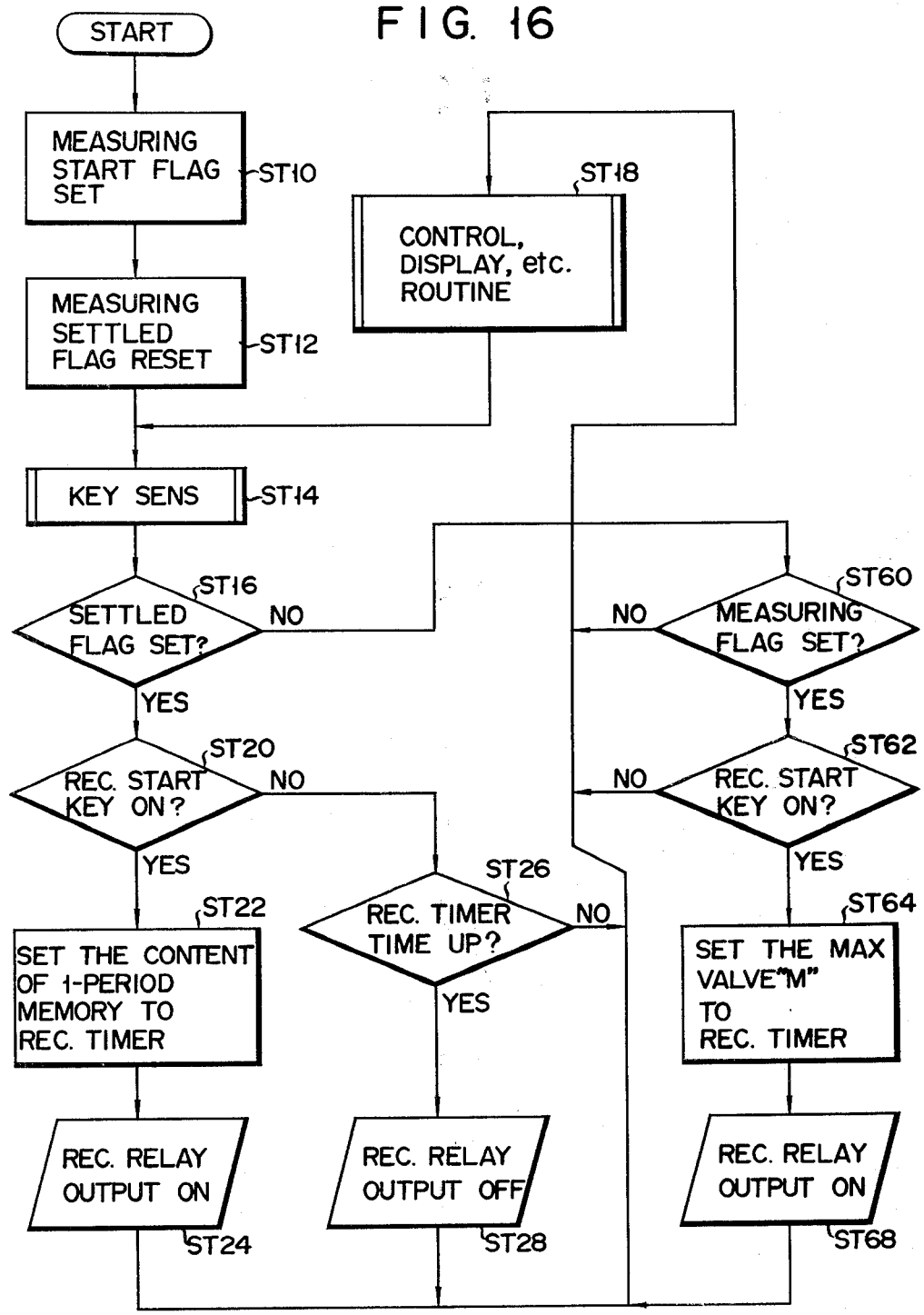

FIG. 16 shows a program flow in which recording operation may be started before the measurement of the one-cycle length of the tape is completed. Since the flow of FIG. 16 includes many steps in common with the flow of FIG. 13, only different steps or portions will be described. In FIG. 16, steps ST60 to ST68 are arranged on the "NO" branch of step ST16 of FIG. 13. If the decision in step ST16 is "NO", then the measuring flag is checked for setting in step ST60. Step ST18 is entered with a decision "NO" in step ST60, whereas step ST62 is entered with "YES". In step ST62, a decision is given on whether or not the recording start key is on. If "NO" is obtained in step ST62, step ST18 is entered; if "YES", step ST64. In step ST64, the recording timer is set by a maximum value M as the one-cycle length data. The value M corresponds to the data $N+\alpha$ of FIG. 2. Then, in step ST68, the recording start relay output is turned on, and step ST18 is entered. In step ST18, the value M is handled as a temporary one-cycle length data, and recording control routine and the like are executed. By the time a cycle of tape run is completed, an actually measured one-cycle length data N will be obtained and used in place of the value M.

Figure 17:
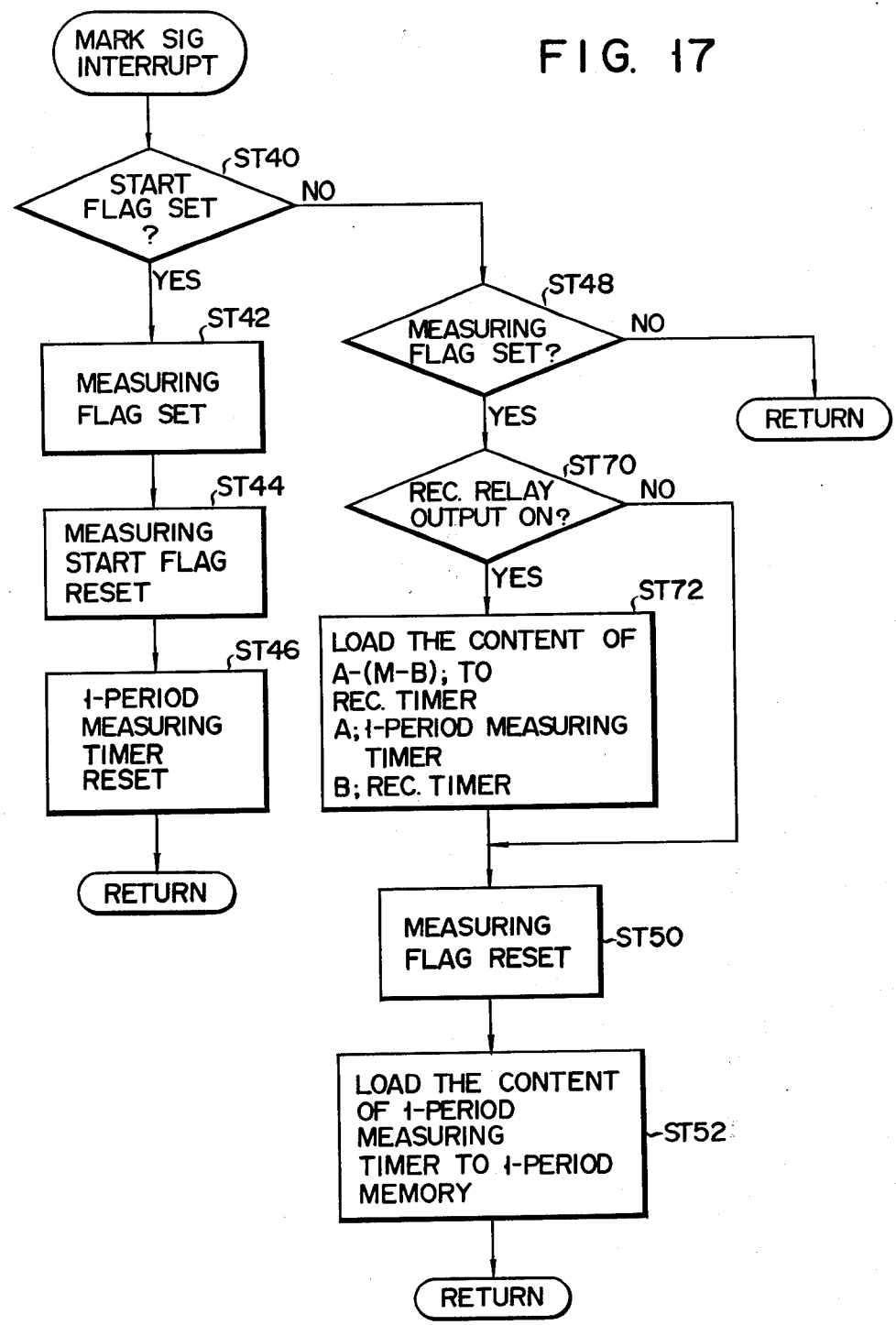

FIG. 17 is a flow chart showing a case of interruption of the mark sensor 27 with use of the flow of FIG. 16. Since the flow of FIG. 17 includes many steps in common with the flow of FIG. 15, only different steps or portions will be described. In FIG. 17, steps ST70 and ST72 are interposed between steps ST48 and ST50 of FIG. 15. If the decision in step ST48 is "YES", then the recording relay output is checked for the on-off state in step ST70. Step ST50 is entered with a decision "NO" in step ST70, whereas step ST72 is entered with "YES".

In step ST72, a value obtained by subtracting the difference between the maximum value M and the content of the recording timer from the content of the one-period measuring timer is set in the recording timer. Then, the original or interrupted step is resumed via steps ST50 and ST52.

Although a specific construction has been illustrated and described herein, it is not intended that the invention be limited to the elements and the constitution disclosed. One skilled in the art will recognize the particular elements or sub-constructions may be used without departing from the spirit of the invention.

What is claimed is:

1. A control apparatus for a recording/playback system using an endless recording medium, comprising:
    a recording medium having a position detecting mark attached to a fixed position thereof and driven at a given speed, said mark moving along an endless loop;
    mark detecting means for detecting said position detecting mark as said recording medium is driven each time said mark passes a predetermined point in said endless loop, and for generating a mark position signal to indicate each time said mark passes said predetermined point;
    first means for measuring the time interval between successive of said mark position signals and for generating and storing a first signal indicative of the one-cycle length of the recording medium; and
    second means for providing in response to said first signal a timing output signal for controlling a recording or playback operation with said recording medium based on the measured one-cycle length of said recording medium.

2. A control apparatus according to claim 1, further comprising:
    means for initiating a one-cycle length measurement by said first means,
    said first means including a first flip-flop generating a second signal at an output clocked to a first logic level upon the first detection of a mark position signal after initiation of a one-cycle length measurement, said second signal clocked to a second logic level upon the second detection of said mark position signal after said initiation,
    wherein said second signal at the output of said first flip-flop is indicative of the one-cycle length of said recording medium.

3. A control apparatus according to claim 2, further comprising:
    a clock generator for generating first clock signals having a predetermined frequency;
    said first means including,
    first counter means for counting the first clock signals in a first direction while said second signal is at the first logic level and for providing the result of said counting as said first signal, and
    a latch memory for storing said first signal.

4. A control apparatus according to claim 3, wherein said second means includes:
    a clock generator for generating second clock signals with a predetermined frequency,
    second counter means in which said first signal is preset when a recording start signal is provided,
    wherein the preset data is counted in a second direction and a third signal is provided when the counting in said second direction reaches a predetermined value, and
    a second flip-flop set when said recording start signal is provided and delivering said timing output signal when said third signal is provided.

5. A control apparatus according to claim 2, wherein said first means includes:
    an integrator for performing a predetermined integrating operation while said second signal is at the first logic level and for storing the result of said integration as said first signal.

6. A control apparatus according to claim 5, wherein said second means includes:
    a ramp-wave generator for generating a predetermined ramp-wave signal when a recording start signal is provided,
    a comparator for comparing said ramp-wave signal with said first signal and providing a fourth signal when the level of said ramp-wave signal passes through the level of said first signal after said recording start signal is applied to said ramp-wave generator, and
    a second flip-flop for delivering said timing output signal during the time that said flip-flop is set by said recording start signal and reset by said fourth signal.

7. An apparatus according to claim 1, wherein said second means further comprises:
    a converter for modifying by a predetermined increment said time interval measured between said successive of said mark position signals such that said first signal is indicative of a one-cycle length increased in proportion to said predetermined increment.

8. A control apparatus for a recording/playback system using an endless recording medium, comprising:
    a recording medium having a position detecting mark attached to a fixed position thereof and driven at a given speed, said mark moving along an endless loop;
    mark detecting means for detecting said position detecting mark as said recording medium is driven each time said mark passes a predetermined point in said endless loop, and for generating a mark position signal to indicate each time said mark passes said predetermined point; and
    microprocessor means for measuring the time interval between a pair of successive of said mark position signals, for storing information based on said measuring and corresponding to the one-cycle length of said recording medium, and for controlling an operation of said recording/playback system based on the stored information.

9. A control apparatus for a recording/playback system using an endless recording medium, comprising:
    a recording medium having a position detecting mark attached to a fixed position thereof and driven at a given speed, said mark moving along an endless loop;
    mark detecting means for detecting said position detecting mark as said recording medium is driven each time said mark passes a predetermined point in said endless loop, and for generating a mark position signal to indicate each time said mark passes said predetermined point;
    initializing means for generating a one-cycle length measuring command signal and for generating a first signal during the time between successive of said position detecting marks after said command signal;

integrating means for integrating said first signal and for producing a second signal indicative of the one-cycle length of said recording medium;

memory means for storing said second signal; and means for monitoring changes in the position of said recording medium to produce a control signal for controlling a recording or playback operation when the position of said medium changes by an amount equal to the one-cycle length indicated by said second signal.

* * * * *